United States Patent
Nelakuditi et al.

(10) Patent No.: US 12,097,821 B1
(45) Date of Patent: Sep. 24, 2024

(54) ADJUSTABLE PASSENGER RESTRAINT SYSTEM SUPPORT FOR A VEHICLE

(71) Applicant: GM Global Technology Operations LLC, Detroit, MI (US)

(72) Inventors: Srujan Nelakuditi, Riley, MI (US); George W. Wade, III, Bloomfield Hills, MI (US); Kamilo Susman, Royal Oak, MI (US); Paul Winter, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/358,269

(22) Filed: Jul. 25, 2023

(51) Int. Cl.
*B60R 22/06* (2006.01)
*B60R 22/48* (2006.01)

(52) U.S. Cl.
CPC .............. *B60R 22/06* (2013.01); *B60R 22/48* (2013.01)

(58) Field of Classification Search
CPC ....... B60R 22/06; B60R 22/20; B60R 22/201; B60R 22/206; B60R 22/24; B60R 2022/1818
See application file for complete search history.

(56) References Cited

U.S. PATENT DOCUMENTS

| | | | | |
|---|---|---|---|---|
| 5,449,218 A | * | 9/1995 | Beauvais | B60N 2/4221 297/216.19 |
| 6,478,334 B1 | * | 11/2002 | Desmarais | B60R 22/201 280/805 |
| 6,578,917 B1 | * | 6/2003 | Aubert | B60N 2/22 297/362.11 |
| 10,035,513 B2 | | 7/2018 | Miller et al. | |
| 10,981,537 B2 | | 4/2021 | Vega et al. | |
| 2016/0311399 A1 | * | 10/2016 | Miller | B60R 22/201 |

FOREIGN PATENT DOCUMENTS

| | | | | |
|---|---|---|---|---|
| DE | 102016107333 A1 | | 10/2016 | |
| DE | 102016015234 A1 | * | 6/2018 | ........... B60R 22/201 |
| DE | 102020115076 A1 | | 12/2020 | |
| GB | 2150012 A | * | 6/1985 | ........... B60R 22/201 |

OTHER PUBLICATIONS

Behle et al., Motor vehicle with a seat belt system, Jun. 21, 2018, EPO, DE 10 2016 015 234 A1, Machine Translation of Description (Year: 2018).*
German Application No. 10 2023 128 151.8 filed Oct. 14, 2023; German Office Action dated Jul. 5, 2024; 3 pages.

* cited by examiner

*Primary Examiner* — James A English
(74) *Attorney, Agent, or Firm* — CANTOR COLBURN LLP (57) ABSTRACT

A vehicle seat system includes a seat including a seat base and a seat back having a first end pivotally connected to the seat base and a second end. A belt guide system is mounted adjacent to the second end. The belt guide system includes a guide mechanism supportable in a vehicle. The guide mechanism including a guide track having a first end section, a second end section, and an intermediate section extending between the first end and the second end. A shuttle arranged at the guide track. The shuttle is shiftable between the first end section and the second end section. An actuator is operatively connected to the shuttle. The actuator is operable to shift the shuttle between the first end section and the second end section. A belt guide is mounted to the shuttle.

20 Claims, 6 Drawing Sheets

ADJUSTABLE PASSENGER RESTRAINT SYSTEM SUPPORT FOR A VEHICLE

INTRODUCTION

The subject disclosure relates to the art of passenger restraint systems for vehicles and, more particularly to an adjustable passenger restraint system support for a vehicle.

Many passenger vehicles, particularly those manufactured after 1968 are equipped with passenger restraint systems. Initially, vehicles were equipped with lap belts. In some cases, an additional, separate, shoulder belt may have also been provided. The use of lap belts was shown to reduce deceleration injuries. As vehicle seating systems developed, improvements in restraint systems also came into being. A combined lap belt and shoulder belt including a retractor responsive to deceleration forces was developed and incorporated into vehicles. The combined lap and shoulder belt further reduced deceleration injuries.

In addition to passive restraint systems such as lap belts and shoulder belts, supplemental restraint systems, such as airbags were added as further safety systems for seated passengers. While passive and supplemental restraint systems have been shown to be effective at protecting seated passengers, they are not as effective for reclined passengers.

In a reclined position, the shoulder belt may be out of position, e.g, hovering above the passenger. A shoulder belt that is out of position in this manner may allow too much forward movement of the passenger during a sudden deceleration. As such, there remains a need to protect passengers that may be in a reclined position. Accordingly, it is desirable to provide a system that may adjust restraint configurations to not only accommodate seated passengers in an upright position but also passengers that may be in a reclined, a highly reclined, or sleeping position.

SUMMARY

A vehicle seat system, in accordance with a non-limiting example, includes a seat including a seat base and a seat back having a first end pivotally connected to the seat base and a second end. A belt guide system is mounted adjacent to the second end. The belt guide system includes a guide mechanism supportable in a vehicle. The guide mechanism including a guide track having a first end section, a second end section, and an intermediate section extending between the first end and the second end. A shuttle arranged at the guide track. The shuttle is shiftable between the first end section and the second end section. An actuator is operatively connected to the shuttle. The actuator is operable to shift the shuttle between the first end section and the second end section. A belt guide is mounted to the shuttle.

In addition to one or more of the features described herein a seat back position sensor is coupled to the seat back, the seat back position sensor detecting an angular displacement from vertical of the seat back.

In addition to one or more of the features described herein a controller is operatively connected to the actuator and the seat back sensor, the actuator shifting the shuttle between the first end section and second end section in response to movement of the seat back detected by the seat back sensor.

In addition to one or more of the features described herein the belt guide is pivotally mounted to the shuttle.

In addition to one or more of the features described herein the guide track is linear.

In addition to one or more of the features described herein the seat is a highly reclinable seat such that the seat back may reclined relative to the seat base at least 35° from vertical.

In addition to one or more of the features described herein the seat base includes a forward end and a rearward end, the forward end being upwardly pivotable at least 20° from horizontal.

A vehicle, in accordance with a non-limiting example, includes a body including a passenger compartment and a vehicle seat system arranged in the passenger compartment. The vehicle seat system includes a seat including a seat base and a seat back having a first end pivotally connected to the seat base and a second end. A belt guide system is mounted adjacent to the second end of the seat base. The belt guide system includes a guide mechanism supported in a vehicle. The guide mechanism includes a guide track having a first end section, a second end section, and an intermediate section extending between the first end and the second end. A shuttle is arranged at the guide track. The shuttle being shiftable between the first end section and the second end section. An actuator is operatively connected to the shuttle. The actuator is operable to shift the shuttle between the first end section and the second end section. A belt guide is mounted to the shuttle.

In addition to one or more of the features described herein a seat back position sensor is coupled to the seat back, the seat back position sensor detecting an angular displacement from vertical of the seat back.

In addition to one or more of the features described herein a controller is operatively connected to the actuator and the seat back sensor, the actuator shifting the shuttle between the first end section and the second end section in response to movement of the seat back detected by the seat back sensor.

In addition to one or more of the features described herein the belt guide is pivotally mounted to the shuttle.

In addition to one or more of the features described herein the guide track is linear.

In addition to one or more of the features described herein the seat is a highly reclinable seat such that the seat back may reclined relative to the seat base at least 35° from vertical.

In addition to one or more of the features described herein the seat base includes a forward end and a rearward end, the forward end being upwardly pivotable at least 20° from horizontal.

In addition to one or more of the features described herein the body includes a plurality of support members including an "A" pillar, a "B" pillar, and a "C" pillar, the belt guide system being mounted to the "C" pillar.

A method of adjusting a seatbelt belt guide member includes detecting a change of position of a seatback. The seatback moving from a first position to a second position. The method further includes shifting the seatbelt belt guide from a first anchor location corresponding to the first position of the seatback to a second anchor position corresponding to the second position of the seatback.

In addition to one or more of the features described herein shifting the seatbelt anchor includes operating an electric motor.

In addition to one or more of the features described herein operating the electric motor includes rotating a lead screw to shift the seatbelt anchor from the first anchor location to the second anchor position.

In addition to one or more of the features described herein detecting the change of position of a seatback includes detecting a change in angle of the seatback.

In addition to one or more of the features described herein detecting the change of position of a seatback includes detecting the seatback in a highly reclined position.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
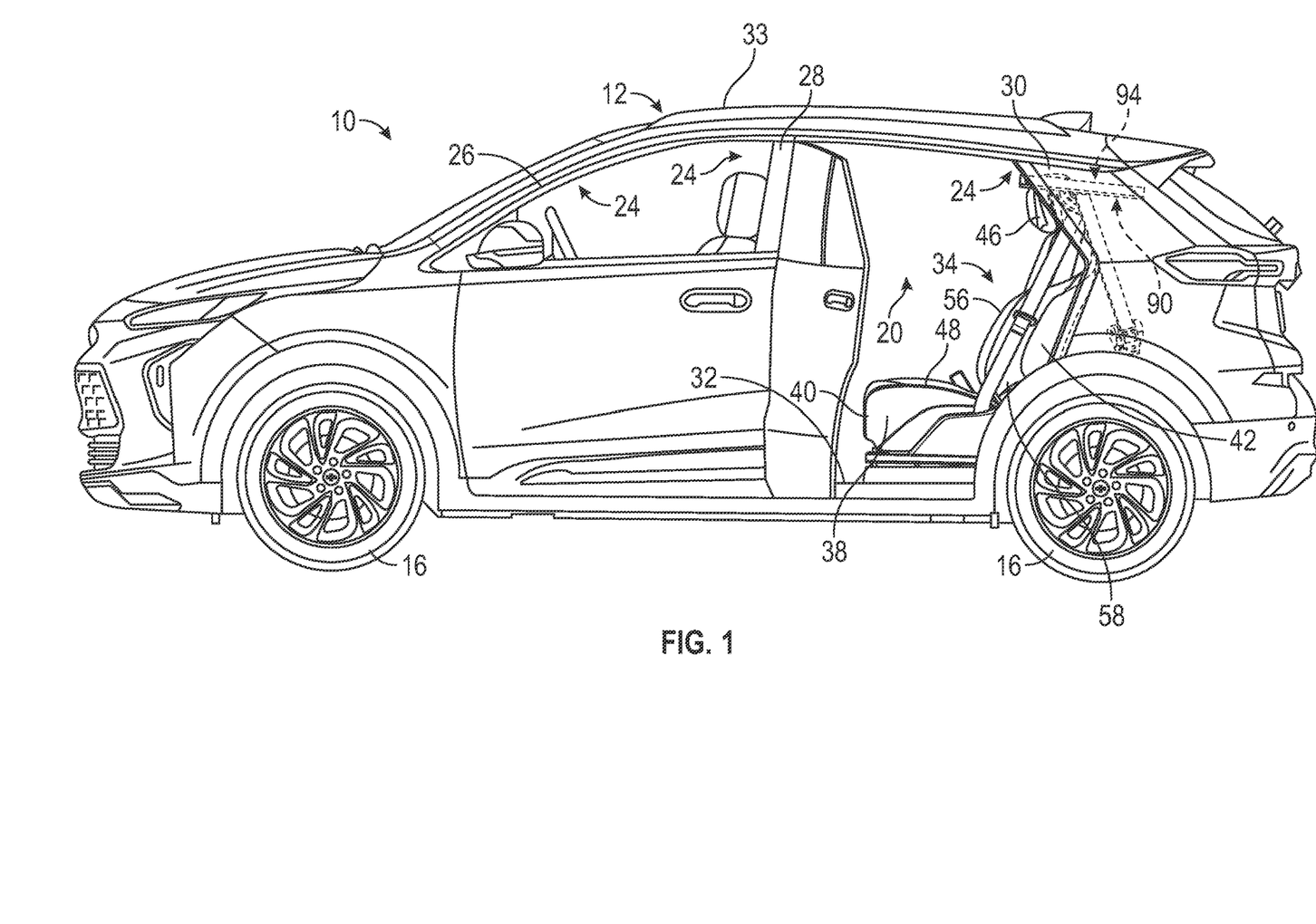
FIG. 1 is a left side view of a vehicle including an adjustable passenger restraint system support, in accordance with a non-limiting example.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having a plurality of structural supports 24. Structural supports 24 include an "A"-pillar 26, a "B"-pillar 28, and a C-Pillar 30. Additional structural supports (not separately labeled) are also present. Structural supports 24 extend between a passenger compartment floor 32 and a roof 33. A plurality of seats, one of which is indicated at 34, is arranged in passenger compartment 20. Seats 34 may include outer seats, (e.g., seats that are arranged adjacent a door for example), and middle seats, (e.g., seats that are disposed between outer seats.)

Figure 2:
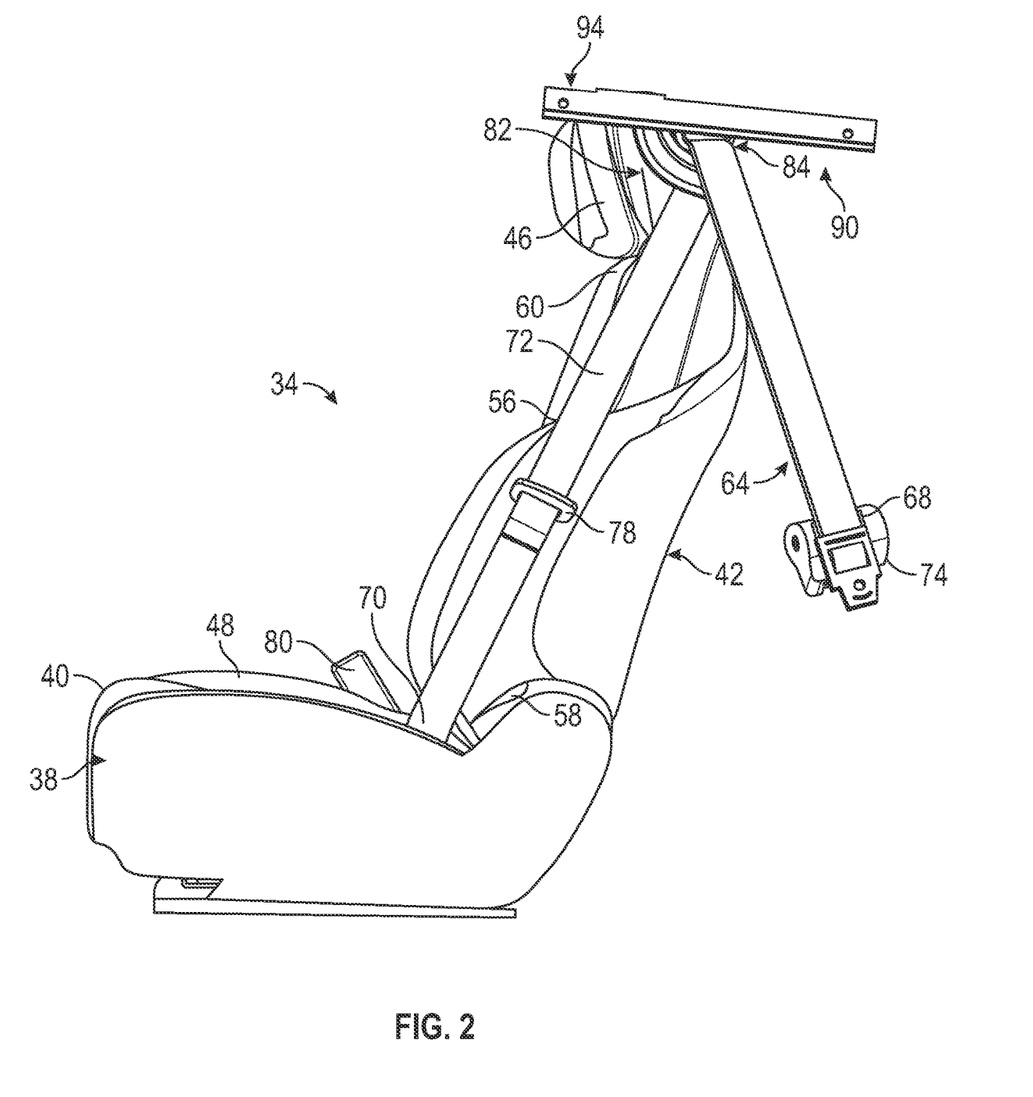
FIG. 2 is a left side view of a passenger seat including the adjustable passenger restraint system support coupled to a belt guide system, in accordance with a non-limiting example.
Figure 3:
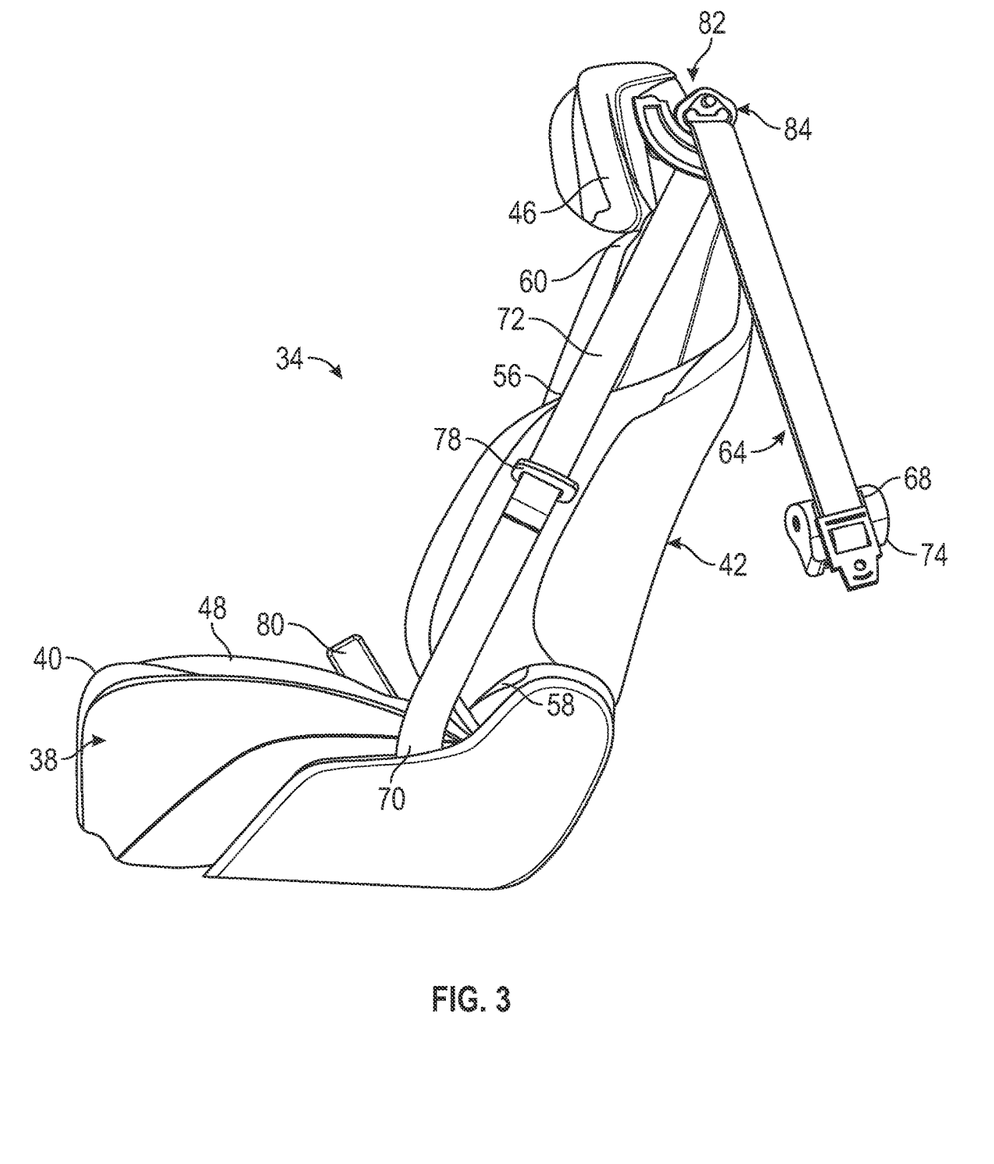
FIG. 3 is a left side view of the passenger seat of FIG. 2 without the belt guide system, in accordance with a non-limiting example.
Figure 5:
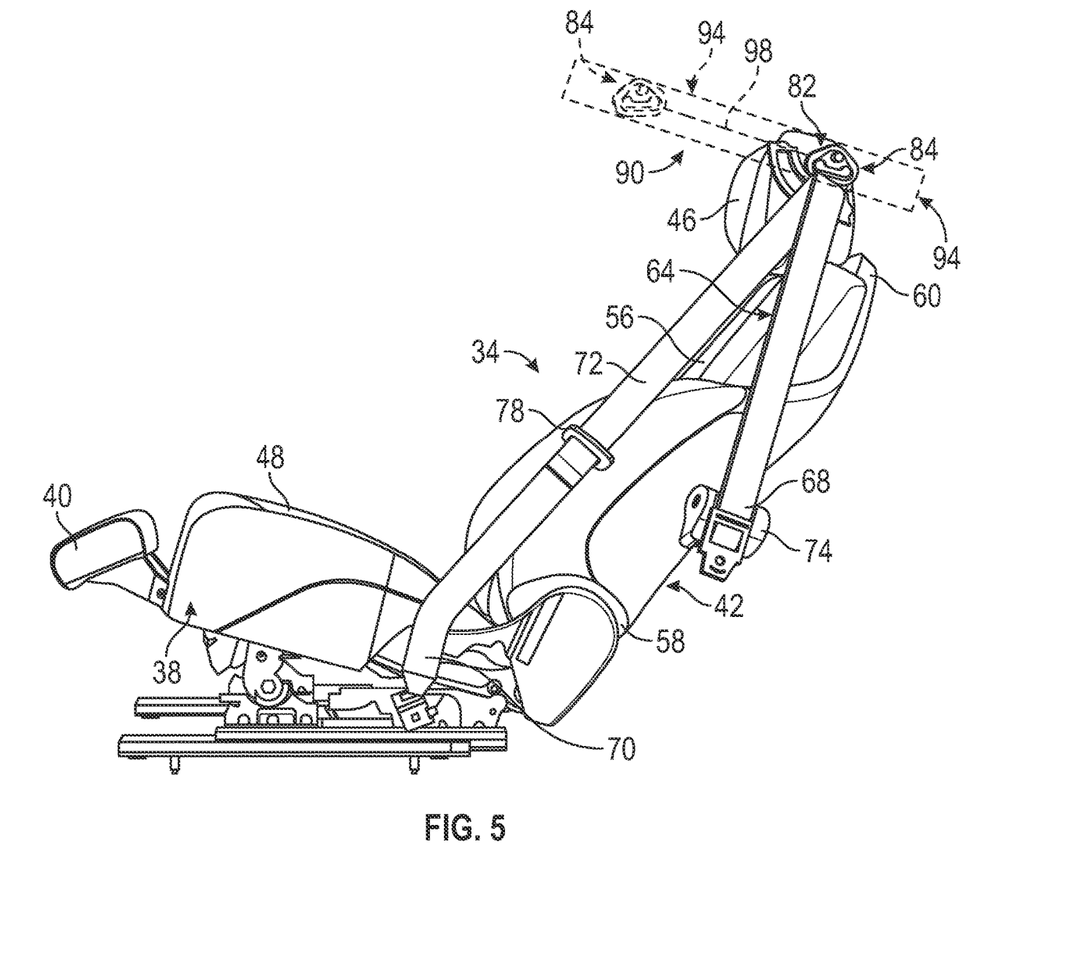
FIG. 5 is a left side view of the passenger seat and the adjustable passenger restraint system support of FIG. 4, in the highly reclined configuration, in accordance with a non-limiting example.

In accordance with a non-limiting example shown in FIGS. 2 and 3, seat 34 includes a seat base 38 including a leg support 40 and a seat back 42 including a headrest 46. Seat back 42 is pivotally connected to seat base 38. Seat base 38 includes a seating surface 48 and seat back 42 includes a support surface 56 having a first end 58 pivotally connected to seat base 38 and a second end 60 that supports headrest 46. As will be detailed herein, seat back 42 may pivot about first end 58 between a first or upright position (FIG. 2) and a second or highly reclined position (FIG. 5). At this point, it should be understood that the highly reclined position describes a state in which seat back 42 reclines more than 35° from vertical and seat base 38 may pivot upwardly more than 20° from horizontal, and leg support 40 is raised and extends outwardly from seat base 38.

A passenger restrain system, shown in the form of a seatbelt 64 is provided adjacent to seat 34. Seatbelt 64 includes a first end portion 68 fixedly mounted to, for example, "C"-pillar 30, a second end portion 70 connected to seat base 38 and an intermediate portion 72. Intermediate portion 72 extends between first end portion 68 and second end portion 70. First end portion 68 includes a retractor 74 coupled to "C"-pillar 30, in a non-limiting example. A buckle 78 is slidingly supported on intermediate portion 72. Buckle 78 selectively connects with a belt release 80 arranged adjacent to seat 34. In a non-limiting example, intermediate portion 72 passes through an adjustable passenger restraint system support 82, shown in the form of a belt guide 84 arranged adjacent to second end 60 of seat back 42.

Figure 6:
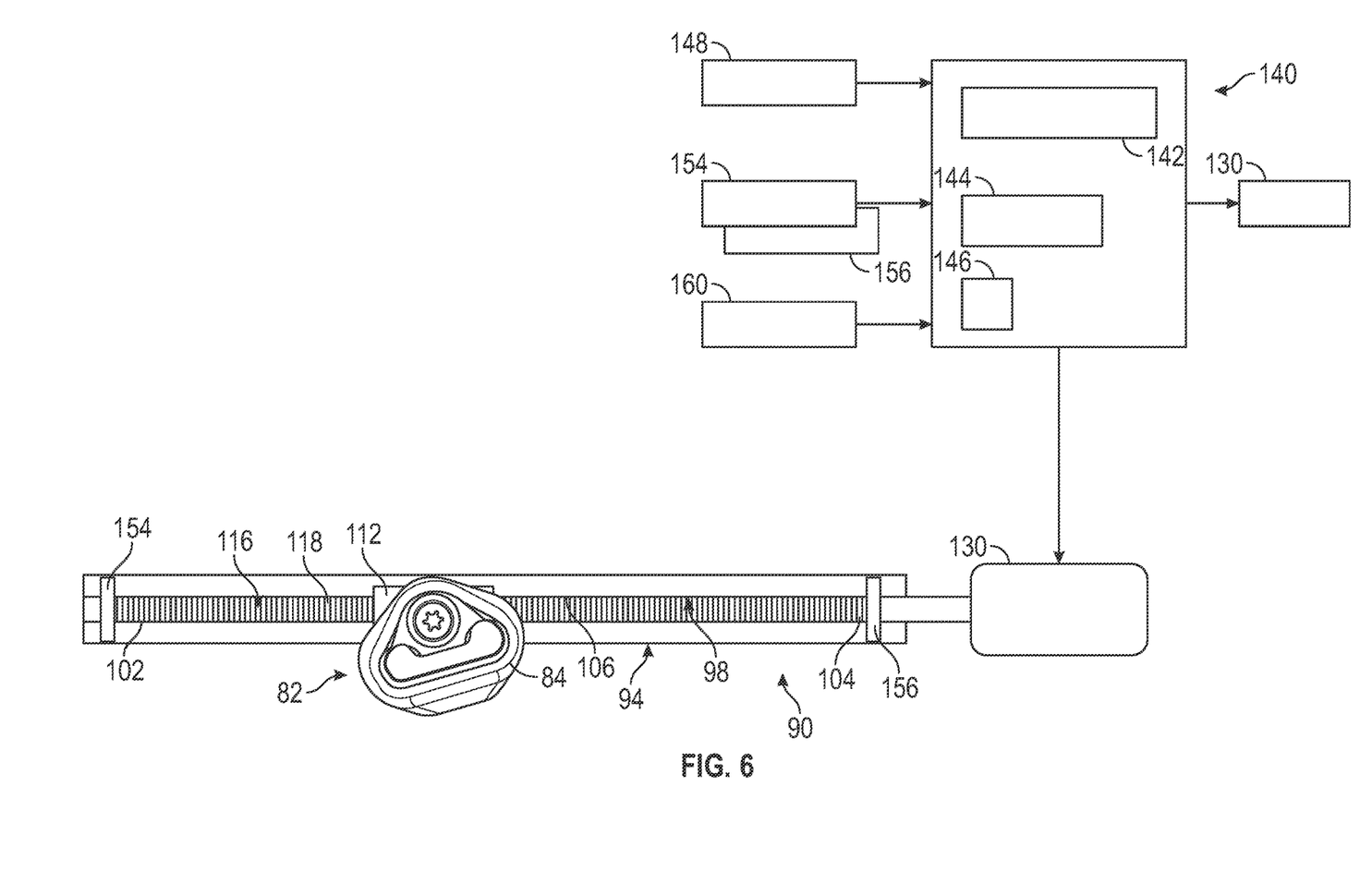
FIG. 6 is a plan view of the belt guide system coupled to the adjustable passenger restraint system support, in accordance with a non-limiting example.

In a non-limiting example, belt guide 84 is connected to a belt guide system 90 mounted to, for example, "C"-pillar 30 as shown in FIG. 1. As will be detailed more fully herein belt guide system 90 includes a guide mechanism 94 that shifts belt guide 84 between a forward position, FIG. 2, and a rearward position, FIG. 5 as seat back 42 shifts between the upright position and the highly reclined position. Referring to FIG. 6 guide mechanism 94 includes a guide track 98 having a first end section 102, a second end section 104, and an intermediate section 106 extending between the first end section 102 and the second end section 104. Guide track 98 is shown to be substantially linear. It should however be understood that the shape of the guide track may vary. A shuttle 112 connected to belt guide 84 is shifted between first end section 102 and second end section 104.

In a non-limiting example, shuttle 112 is supported by a lead screw 116 having a plurality of threads 118. Lead screw 116 is connected to an actuator which may take the form of an electric motor 130. Electric motor 130 rotates lead screw 116 to shift shuttle 112 between first end section 102 and second end section 104. At this point, while shown employing a lead screw driven by an electric motor to move the shuttle, a wide variety of mechanisms may be employed to shift the guide member as seat back 42 moves between the upright configuration and the highly reclined configuration.

With continued reference to FIG. 6, belt guide system 90 is connected to a controller 140 having a central processing unit (CPU) 142, a non-volatile memory module 144, and a shuttle control module 146. Controller 140 receives signals from a seat actuator 148 as well as a first limit switch 154, a second limit switch 156 and a seat position sensor 160 mounted to seat 34. In operation, a user may choose to shift seat 34 from the upright configuration, FIG. 2, to the highly reclined configuration, FIG. 5, by engaging seat actuator 148. At such a time, a signal may pass from seat actuator 148 to controller 140 indicating that seat back 42 is moving. When seat back 42 stops moving, controller 140 receives a signal from seat position sensor 160 indicating that seat back 42 is in the highly reclined position.

Figure 4:
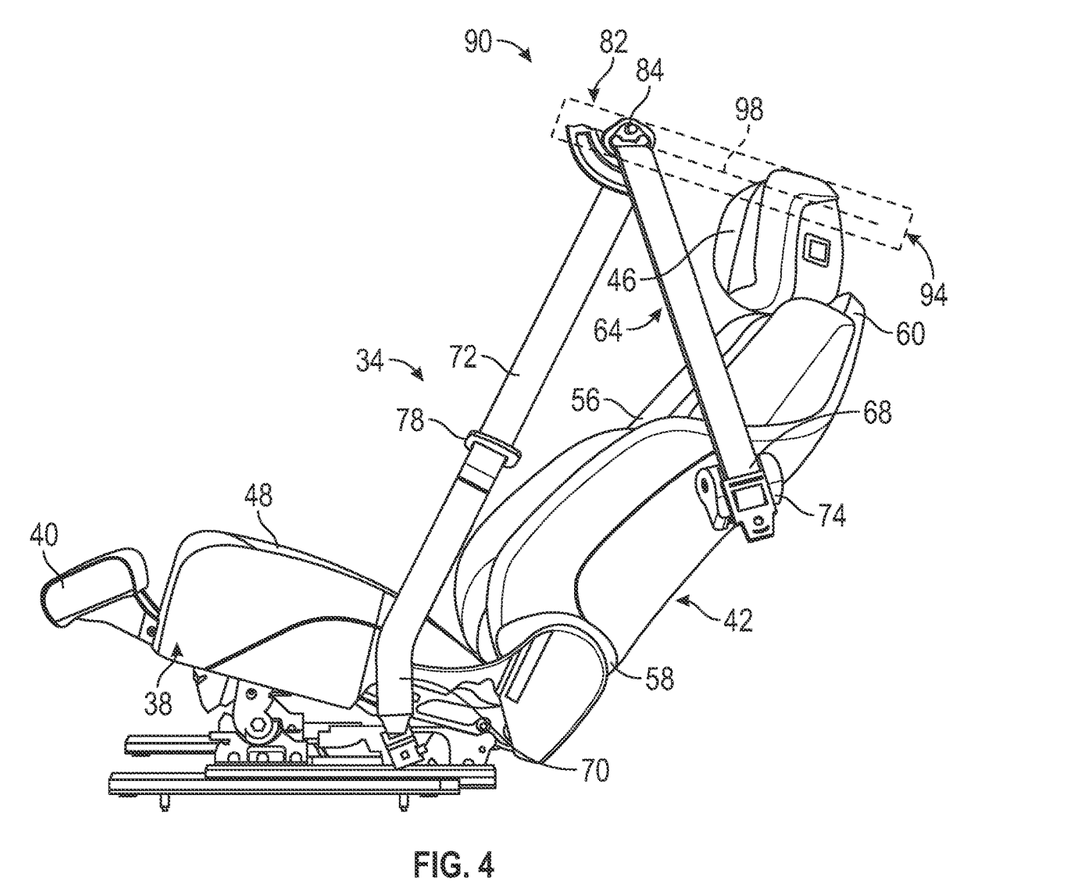
FIG. 4 is a left side view of the passenger seat and the adjustable passenger restraint system support of FIG. 2, transitioning from an upright configuration to a highly reclined configuration, in accordance with a non-limiting example.

Controller 140 signals shuttle control module 146 to shift shuttle 112 from first end section 102 toward second end section 104 of guide track 98. Movement of shuttle 112 is constrained by first limit switch 154 and second limit switch 156. Shuttle 112 then repositions belt guide 84 from a first position (FIG. 4) to a second position (FIG. 5). In the second position, seat belt 64 is repositioned closer to a resting passenger so as to limit excursions from seat 34 during a sudden deceleration. When seat 34 is returned to the upright position, belt guide system 90 shifts shuttle 112 and belt guide 84 back towards first end section 102.

In a non-limiting example, belt guide system 90 may reposition belt guide 84 between first end section 102 and second end section 104 based on seat angle. Shuttle position 112 may be adjusted based on seat angle as sensed by seat position sensor 160 or based on user preferences stored in non-volatile memory module 144. Thus, in a non-limiting example, belt guide system 90 operates to maintain seat belt 64 in a selected position in order to limit excursions from seat 34 during a sudden deceleration regardless of seat back angle.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle seat system for a vehicle defining a front-rear axis and a vertical axis and comprising:
    a seat including a seat base and a seat back having a first end pivotally connected to the seat base and a second end;
    a belt guide system mounted adjacent to the second end, the belt guide system including:
        a guide mechanism supportable in a vehicle, the guide mechanism including a guide track having a first end section, a second end section, and an intermediate section extending between the first end and the second end;
        a shuttle arranged at the guide track, the shuttle being shiftable between the first end section and the second end section;
        an actuator operatively connected to the shuttle, the actuator being operable to shift the shuttle between the first end section and the second end section;
        a belt guide mounted to the shuttle;
        a seat back position sensor coupled to the seat back, the seat back position sensor detecting an angular displacement of the seat back from the vertical axis; and
        a controller operatively connected to the actuator and the seat back position sensor, the actuator shifting the shuttle between the first end section and second end section in response to the angular displacement of the seat back detected by the seat back position sensor,
        wherein the guide track guides the shuttle in a direction that has a larger component along the front-rear axis than in the vertical axis.

2. The vehicle seat system according to claim 1, wherein the belt guide is pivotally mounted to the shuttle.

3. The vehicle seat system according to claim 1, wherein the guide track is linear.

4. The vehicle seat system according to claim 1, wherein the seat is a highly reclinable seat such that the seat back may reclined relative to the seat base at least 35° from the vertical axis.

5. The vehicle seat system according to claim 4, wherein the seat base includes a forward end and a rearward end, the forward end being upwardly pivotable at least 20° from the front-rear axis.

6. The vehicle seat system according to claim 1,
    wherein the vehicle defines a lateral axis orthogonal to the front-rear axis and the vertical axis,
    wherein the seat comprises a headrest mounted on the seat back,
    wherein the seat back is movable from a first position and a second position angularly displaced from the first position,
    wherein, when the seat back is in the first position, the belt guide at least partially overlaps the headrest along the lateral axis, and
    wherein, when the seat back is moved to the second position, the shuttle is shifted to move the belt guide to a position at least partially overlapping the headrest along the lateral axis.

7. The vehicle seat system according to claim 1, wherein the belt guide system is configured such that the belt guide is above an entirety of the seat back along the vertical axis with the shuttle positioned in the first end section and positioned in the second end section.

8. A vehicle defining a front-rear axis and a vertical axis and comprising:
    a body including a passenger compartment;
    a vehicle seat system arranged in the passenger compartment, the vehicle seat system comprising:
        a seat including a seat base and a seat back having a first end pivotally connected to the seat base and a second end; and
        a belt guide system mounted adjacent to the second end of the seat base, the belt guide system including:
            a guide mechanism supportable in a vehicle, the guide mechanism including a guide track having a first end section, a second end section, and an intermediate section extending between the first end and the second end;

a shuttle arranged at the guide track, the shuttle being shiftable between the first end section and the second end section;

an actuator operatively connected to the shuttle, the actuator being operable to shift the shuttle between the first end section and the second end section;

a belt guide mounted to the shuttle;

a seat back position sensor coupled to the seat back, the seat back position sensor detecting an angular displacement of the seat back from the vertical axis; and a controller operatively connected to the actuator and the seat back position sensor, the actuator shifting the shuttle between the first end section and the second end section in response to angular displacement of the seat back detected by the seat back position sensor, wherein the guide track guides the shuttle in a direction that has a larger component along the front-rear axis than in the vertical axis.

9. The vehicle according to claim 8, wherein the belt guide is pivotally mounted to the shuttle.

10. The vehicle according to claim 8, wherein the guide track is linear.

11. The vehicle according to claim 8, wherein the seat is a highly reclinable seat such that the seat back may reclined relative to the seat base at least 35° from the vertical axis.

12. The vehicle according to claim 11, wherein the seat base includes a forward end and a rearward end, the forward end being upwardly pivotable at least 20° from the front-rear axis.

13. The vehicle according to claim 8, wherein the body includes a plurality of support members including an "A" pillar, a "B" pillar, and a "C" pillar, the belt guide system being mounted to the "C" pillar.

14. The vehicle according to claim 8,
wherein the vehicle defines a lateral axis orthogonal to the front-rear axis and the vertical axis,
wherein the seat comprises a headrest mounted on the seat back,
wherein the seat back is movable from a first position and a second position angularly displaced from the first position,
wherein, when the seat back is in the first position, the belt guide at least partially overlaps the headrest along the lateral axis, and
wherein, when the seat back is moved to the second position, the shuttle is shifted to move the belt guide to a position at least partially overlapping the headrest along the lateral axis.

15. The vehicle seat system according to claim 8, wherein the belt guide system is configured such that the belt guide is above an entirety of the seat back along the vertical axis with the shuttle positioned in the first end section and positioned in the second end section.

16. A method of adjusting a seatbelt belt guide in a vehicle that defines a forward direction, the method comprising:
detecting an angular displacement of a seatback from the vertical axis, the seatback moving from a first position to a second position;
and
shifting the seatbelt belt guide from a first anchor location corresponding to the first position of the seatback to a second anchor position corresponding to the second position of the seatback in response to the angular displacement of the seatback via a belt guide system comprising a guide mechanism including a guide track having a first end section correspond to the first anchor location and a second end section corresponding to the second anchor location and a shuttle arranged at the guide track shiftable between the first end section and the second end section,
wherein the guide track guides the shuttle in a direction that has a larger component along the front-rear axis than in the vertical axis.

17. The method of claim 16, wherein shifting the seatbelt guide includes operating an electric motor.

18. The method of claim 17 wherein operating the electric motor includes rotating a lead screw to shift the seatbelt guide from the first anchor location to the second anchor position.

19. The method of claim 16, wherein detecting the angular displacement of the seatback includes detecting the seatback in a highly reclined position.

20. The method of claim 16,
wherein the vehicle defines a lateral axis orthogonal to the front-rear axis and the vertical axis,
wherein a headrest is mounted on the seat back,
wherein, when the seat back is in the first position, the belt guide at least partially overlaps the headrest along the lateral axis, and
wherein, when the seat back is moved to the second position, the shuttle is shifted to move the belt guide to a position at least partially overlapping the headrest along the lateral axis.

* * * * *